US011326036B2

(12) United States Patent
Mihori et al.

(10) Patent No.: US 11,326,036 B2
(45) Date of Patent: May 10, 2022

(54) FLAME-RETARDANT PHENOLIC RESIN FOAM

(71) Applicant: Asahi Kasei Construction Materials Corporation, Tokyo (JP)

(72) Inventors: Hisashi Mihori, Tokyo (JP); Noriaki Kikuchi, Tokyo (JP); Masami Komiyama, Tokyo (JP)

(73) Assignee: Asahi Kasei Construction Materials Corporation, Tokyo (JP)

(*) Notice: Subject to any disclaimer, the term of this patent is extended or adjusted under 35 U.S.C. 154(b) by 41 days.

(21) Appl. No.: 17/050,838

(22) PCT Filed: Apr. 26, 2019

(86) PCT No.: PCT/JP2019/018079
§ 371 (c)(1),
(2) Date: Oct. 27, 2020

(87) PCT Pub. No.: WO2019/208811
PCT Pub. Date: Oct. 31, 2019

(65) Prior Publication Data
US 2021/0230389 A1 Jul. 29, 2021

(30) Foreign Application Priority Data

Apr. 27, 2018 (JP) .............................. JP2018-086916
Nov. 30, 2018 (JP) .............................. JP2018-225588

(51) Int. Cl.
*C08J 9/04* (2006.01)
(52) U.S. Cl.
CPC ........... *C08J 9/04* (2013.01); *C08J 2205/052* (2013.01); *C08J 2361/06* (2013.01)
(58) Field of Classification Search
CPC .... C08J 9/04; C08J 2205/052; C08J 2361/06; C08J 9/0023; C08J 9/0033; C08J 9/0038; C08J 9/122; C08J 9/149; C08J 2203/06; C08J 2203/142; C08J 2203/162; C08J 2203/182; C08J 9/144; C08J 2361/10; C08J 9/00; C08L 61/34
See application file for complete search history.

(56) References Cited

U.S. PATENT DOCUMENTS

| 6,476,090 B1 | 11/2002 | Arito et al. |
| 2017/0009037 A1 | 1/2017 | Hamajima et al. |
| 2017/0137591 A1 | 5/2017 | Mukaiyama et al. |
| 2018/0230283 A1* | 8/2018 | Ihara ..................... C08L 61/06 |

FOREIGN PATENT DOCUMENTS

| JP | 6035033 A | * | 2/1985 |
| JP | S6035032 A | * | 2/1985 |
| JP | S6035032 A | | 2/1985 |
| JP | S6035033 A | | 2/1985 |
| JP | S61243 A | | 1/1986 |
| JP | S6195038 A | | 5/1986 |
| JP | S61238833 A | | 10/1986 |
| JP | H01126349 A | * | 5/1989 |
| JP | H01126349 A | | 5/1989 |
| JP | H0249037 A | | 2/1990 |
| JP | H03160038 A | | 7/1991 |
| JP | H03179041 A | | 8/1991 |
| JP | H0532814 A | | 2/1993 |
| JP | H0680814 A | | 3/1994 |
| JP | H073063 A | | 1/1995 |
| JP | H10259266 A | | 9/1998 |
| JP | 2005015725 A | | 1/2005 |
| JP | 2015151524 A | | 8/2015 |
| JP | 2017088650 A | | 5/2017 |
| JP | 2017210618 A | | 11/2017 |
| KR | 1020170007396 A | | 1/2017 |
| KR | 1020180016629 A | | 2/2018 |

OTHER PUBLICATIONS

Mar. 19, 2021, the Supplementary European Search Report issued by the European Patent Office in the corresponding European Patent Application No. 19791585.3.
Jul. 30, 2019, International Search Report issued in the International Patent Application No. PCT/JP2019/018079.
Oct. 27, 2020, International Preliminary Reporton Patentability issued in the International Patent Application No. PCT/JP2019/018079.
Korea Fire Protection System Management Association, Flame Retardant Performance of Fire Insulation Materials, Dec. 11, 2017.

* cited by examiner

*Primary Examiner* — Kara B Boyle
(74) *Attorney, Agent, or Firm* — Kenja IP Law PC

(57) ABSTRACT

A phenolic resin foam has a density of 30 kg/m$^3$ to 80 kg/m$^3$, a closed cell ratio of 85% or more, and reaches a total amount of heat release of 8 MJ/m$^2$ in a time of 20 minutes or more in a heat release test performed using a cone calorimeter.

12 Claims, No Drawings

FLAME-RETARDANT PHENOLIC RESIN FOAM

CROSS-REFERENCE TO RELATED APPLICATIONS

This application claims priority to Japanese Patent Application No. 2018-086916 and Japanese Patent Application No. 2018-225588, which were respectively filed in Japan on Apr. 27, 2018, and Nov. 30, 2018, the entire disclosure of which is incorporated by reference herein.

TECHNICAL FIELD

The present disclosure relates to a flame-retardant phenolic resin foam.

BACKGROUND

Thermal insulation materials have become widely used in recent years from a viewpoint of energy efficiency. In particular, the use of synthetic resin foams has become widespread due to the high thermal insulation performance and economy thereof. However, synthetic resin foams suffer from the rapid spread of fire during a conflagration and come with associated dangers such as deflagration and toxic gas release, and thus there has been demand for a thermal insulation material that has high thermal insulation performance while also receiving certification of incombustibility from the Minister of Land, Infrastructure, Transport and Tourism.

Among such synthetic resin foams, phenolic resin foams with high thermal insulation performance have the best flame retardance among presently available resin foams and are known to have higher safety during a conflagration than any other resin foams. However, even phenolic resin foams do not have flame retardance of a level comparable to Minister of Land, Infrastructure, Transport and Tourism-certified incombustible materials, and although attempts have been made to further improve the flame retardance of phenolic resin foams, it has not yet been possible to achieve the aforementioned level of flame retardance.

For example, Patent Literature (PTL) 1 to 3 disclose that flame retardant performance of a phenolic resin foam is improved through the use of a flame retardant.

PTL 1 discloses a phenolic resin foam in which high thermal insulation performance is maintained while also improving flame retardant performance through use of a specific surfactant and phosphoric flame retardant. However, oxygen index is used as an index for flame retardant performance in PTL 1. This test measures the minimum oxygen concentration (vol %) necessary for combustion of a material to continue and thus the continuation of combustion is a precondition for this test. Therefore, the materials indicated in the Examples each have low flame retardant performance that is not comparable to the flame retardant performance required of a Minister of Land, Infrastructure, Transport and Tourism-certified incombustible material for which non-combustion is a precondition.

Moreover, combustion tests used for phenolic resin foams obtained in PTL 2 and PTL 3 are respectively a surface heating test based on the Ministry of Construction Notice No. 1828 of December 1970 and a test based on JIS A 1321. Although these can be considered material tests that are comparable in terms of content to a heat release test (ISO 5660, Part-1, cone calorimeter) that is the current test standard for receiving certification of the Minister of Land, Infrastructure, Transport and Tourism, the phenolic resin foams described in PTL 2 and 3 are highly densified to a level clearly exceeding 100 kg/m³ and each have low thermal insulation performance, and thus were not able to achieve thermal insulation performance together with incombustibility.

CITATION LIST

Patent Literature

PTL 1: JP 2017-210618 A
PTL 2: JP H10-259266 A
PTL 3: JP H06-80814 A

SUMMARY

Technical Problem

The present disclosure provides a phenolic resin foam that has a low density of less than 100 kg/m³ while also having high thermal insulation performance and also displaying high flame retardant performance enabling certification as an incombustible material by the Minister of Land, Infrastructure, Transport and Tourism.

Solution to Problem

Specifically, the present disclosure provides the following.

[1] A phenolic resin foam having a density of 30 kg/m³ to 80 kg/m³, a closed cell ratio of 85% or more, and reaching a total amount of heat release of 8 MJ/m² in a time of 20 minutes or more in a heat release test performed using a cone calorimeter.

[2] The phenolic resin foam according to [1], having a peak at either or both a diffraction angle 2θ of 14.9° to 15.9° and a diffraction angle 2θ of 16.2° to 17.2° in an X-ray diffraction pattern obtained through analysis by X-ray diffraction.

[3] The phenolic resin foam according to [1] or [2], having a highest intensity peak at either or both a diffraction angle 2θ of 14.9° to 15.9° and a diffraction angle 2θ of 16.2° to 17.2° in an X-ray diffraction pattern obtained through analysis by X-ray diffraction.

[4] The phenolic resin foam according to any one of [1] to [3], having a peak at both a diffraction angle 2θ of 14.9° to 15.9° and a diffraction angle 2θ of 16.2° to 17.2° in an X-ray diffraction pattern obtained through analysis by X-ray diffraction.

[5] The phenolic resin foam according to any one of [1] to [4], having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 0.5≤A/B≤4.5.

[6] The phenolic resin foam according to any one of [1] to [4], having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 1.0≤A/B≤4.5.

Advantageous Effect

According to the present disclosure, a phenolic resin foam has high thermal insulation performance and low density of less than 100 kg/m³ while also displaying high flame retardant performance that enables the entire foam to be a incombustible material without using incombustible surface materials at upper and lower surfaces of the foam in a thickness direction thereof, which facilitates handling of the foam and enables use thereof as an incombustible material even when cutting or the like of the foam is performed to obtain a complicated shape or when the installation orientation or direction of the foam is altered. Consequently, a high-performance phenolic resin foam can be used in applications in which the adoption thereof has not previously been possible due to shape restrictions.

DETAILED DESCRIPTION

The present disclosure relates to the discovery of a phenolic resin foam having a balance of high thermal insulation performance and incombustibility, which could not previously be achieved, through appropriate selection of a flame retardant necessary for expression of incombustibility, identification of an additive amount of the flame retardant necessary for expression of incombustibility, and optimization of the density and production conditions of the phenolic resin.

The following provides a detailed description of an embodiment of the present disclosure (hereinafter, also referred to as the "present embodiment").

A phenolic resin foam of the present embodiment achieves a total amount of heat release of 8 MJ/m² or less 20 minutes after the start of heating in a heat release test performed using a cone calorimeter under conditions described in the EXAMPLES section.

The phenolic resin foam of the present embodiment is produced by adding a surfactant and a flame retardant to a "phenolic resin" to obtain a "phenolic resin composition", further adding a blowing agent and an acidic curing agent including an organic acid to obtain a "foamable phenolic resin composition" that has been provided with foamability and curability, loading the "foamable phenolic resin composition" into a mixer, ejecting the "foamable phenolic resin composition" from the mixer after mixing thereof, and then performing foaming and curing of the "foamable phenolic resin composition" under heating. Note that in a case in which a surface material, siding, or the like is attached, a part formed of the phenolic resin, exclusive of these other parts, is defined as a "phenolic resin foam".

The phenolic resin is a resol-type phenolic resin obtained by heating a phenol and an aldehyde in a temperature range of 40° C. to 100° C. in the presence of an alkali metal hydroxide or an alkaline earth metal hydroxide to synthesize the phenolic resin. The molar ratio in which the phenol and the aldehyde are used is preferably within a range of 1:1 to 1:4.5, and more preferably within a range of 1:1.5 to 1:2.5.

Examples of phenols that can preferably be used in synthesis of the phenolic resin include phenol and also resorcinol, catechol, o-, m-, and p-cresol, xylenols, ethylphenols, p-tert-butylphenol, and the like. Moreover, a binuclear phenol can be used.

Examples of aldehydes that can preferably be used in synthesis of the phenolic resin include formaldehyde and also glyoxal, acetaldehyde, chloral, furfural, benzaldehyde, and the like, and derivatives of any of these aldehydes can also be used.

An additive such as urea, dicyandiamide, or melamine may be added to the resol-type phenolic resin during synthesis or after synthesis as necessary. In a case in which urea is added, it is preferable that urea that has been methylolated in advance using an alkali catalyst is mixed with the resol-type phenolic resin.

Since the resol-type phenolic resin obtained after synthesis normally contains excess water, the resol-type phenolic resin is preferably dehydrated to reach a suitable viscosity for foaming.

Various types of additives such as an aliphatic hydrocarbon, a high-boiling point alicyclic hydrocarbon, or a mixture thereof, a diluent for viscosity adjustment such as ethylene glycol or diethylene glycol, or a phthalic acid compound or the like, as necessary, can be added to the phenolic resin. The viscosity of the phenolic resin and the phenolic resin composition at 40° C. is preferably not less than 5,000 mPa·s and not more than 25,000 mPa·s.

The water content of the phenolic resin that is subjected to a subsequently described step of mixing using a mixer is not less than 2.0 mass % and not more than 8.0 mass %, preferably not less than 2.5 mass % and not more than 6.5 mass %, and even more preferably not less than 3.0 mass % and not more than 5.0 mass %. In a situation in which a flame retardant is added and the water content of the phenolic resin is high, cell membranes have a high tendency to rupture, leading to reduction of the closed cell ratio, and thus reduction of thermal insulation performance. Through the water content of the phenolic resin at the point at which a flame retardant is added being 8.0 mass % or less in response to the above, cell membrane rupturing can be prevented and thermal insulation performance can be maintained irrespective of the amount of acid catalyst. Moreover, a water content of 2.0 mass % or more can inhibit a rise in viscosity and facilitate liquid transportation inside equipment.

Non-ionic surfactants are effective as the surfactant that is added to the phenolic resin and preferable examples thereof include an alkylene oxide that is a copolymer of ethylene oxide and propylene oxide, a condensate of an alkylene oxide and castor oil, a condensation product of an alkylene oxide and an alkylphenol such as nonylphenol or dodecylphenol, a polyoxyethylene alkyl ether in which the alkyl ether part has a carbon number of 14 to 22, a fatty acid ester such as a polyoxyethylene fatty acid ester, a silicone compound such as polydimethylsiloxane, and a polyalcohol. These surfactants may be used individually or as a combination of two or more types.

The amount of the surfactant that is used per 100 parts by mass of the phenolic resin is preferably within a range of 0.3 parts by mass to 10 parts by mass.

The flame retardant that is added to the phenolic resin is preferably an ammonium polyphosphate. In particular, TAIEN C=II (product name; produced by Taihei Chemical Industrial Co., Ltd.), TAIEN K (product name; produced by Taihei Chemical Industrial Co., Ltd.), Exolit AP 423 (product name; produced by Clariant), or the like can preferably be used as the flame retardant. One of these flame retardants may be used individually, or a plurality of these flame retardants may be used together.

The amount of the flame retardant that is added to the phenolic resin composition per 100 parts by mass of the phenolic resin is preferably not less than 10 parts by mass and not more than 35 parts by mass, more preferably not less than 13 parts by mass and not more than 30 parts by mass, and even more preferably not less than 15 parts by mass and not more than 25 parts by mass. In a case in which a plurality of flame retardants are used, the added number of parts by mass is the total added number of parts by mass of all of the flame retardants.

A hydrocarbon, a hydrofluorocarbon, a chlorinated hydrofluoroolefin, a non-chlorinated hydrofluoroolefin, a chlorinated hydrocarbon, or the like can preferably be used as the blowing agent that is added to the phenolic resin.

The hydrocarbon is preferably a cyclic or chain alkane, alkene, or alkyne having a carbon number of 3 to 7, and specific examples thereof include normal butane, isobutane, cyclobutane, normal pentane, isopentane, cyclopentane, neopentane, normal hexane, isohexane, 2,2-dimethylbutane, 2,3-dimethylbutane, and cyclohexane. Of these hydrocarbons, the pentanes: normal pentane, isopentane, cyclopentane, and neopentane, and the butanes: normal butane, isobutane, and cyclobutane can suitably be used.

Examples of hydrofluorocarbons that can be used include hydrofluoropropenes, hydrochlorofluoropropenes, hydrobromofluoropropenes, hydrofluorobutenes, hydrochlorofluorobutenes, hydrobromofluorobutenes, hydrofluoroethanes, hydrochlorofluoroethanes, and hydrobromofluoroethanes.

Examples of chlorinated hydrofluoroolefins that can be used include 1-chloro-3,3,3-trifluoropropene (for example, Solstice® (Solstice is a registered trademark in Japan, other countries, or both) LBA (product name) produced by Honeywell Japan Ltd.).

Examples of non-chlorinated hydrofluoroolefins that can be used include 1,3,3,3-tetrafluoro-1-propene (for example, Solstice® 1234ze (product name) produced by Honeywell Japan Ltd.), 2,3,3,3-tetrafluoro-1-propene, and 1,1,1,4,4,4-hexafluoro-2-butene.

In a case in which a chlorinated hydrofluoroolefin or a non-chlorinated hydrofluoroolefin is used, the proportional content of these blowing agents among all blowing agents is preferably 30 mass % or more.

Linear and branched chlorinated aliphatic hydrocarbons having a carbon number of 2 to 5 can preferably be used as the chlorinated hydrocarbon. The number of bonded chlorine atoms is preferably 1 to 4. For example, dichloroethane, propyl chloride, isopropyl chloride, butyl chloride, isobutyl chloride, pentyl chloride, isopentyl chloride, or the like is preferable. Of these chlorinated hydrocarbons, propyl chloride and isopropyl chloride, which are chloropropanes, are more preferably used.

Note that the blowing agents described above may be used individually or as a combination of two or more types, and can be freely selected.

Although the preferred amount of the blowing agent in the foamable phenolic resin composition differs depending on the type of blowing agent, compatibility with the phenolic resin, and conditions during foaming and curing such as the temperature and residence time, the amount of the blowing agent per 100 parts by mass, in total, of the phenolic resin and the surfactant is preferably 10.0 parts by mass or less, more preferably not less than 4.5 parts by mass and not more than 10.0 parts by mass, and even more preferably not less than 5.0 parts by mass and not more than 9.0 parts by mass.

In the present embodiment, a foam nucleating agent may be used in production of the phenolic resin foam. A gaseous foam nucleating agent such as a low-boiling point substance (for example, nitrogen, helium, argon, or air) having a boiling point at least 50° C. lower than the blowing agent can be added as the foam nucleating agent. Moreover, a solid foam nucleating agent such as an inorganic powder (for example, aluminum hydroxide powder, aluminum oxide powder, calcium carbonate powder, talc, kaolin, silica stone powder, silica sand, mica, calcium silicate powder, wollastonite, glass powder, glass beads, fly ash, silica fume, gypsum powder, borax, slag powder, alumina cement, or Portland cement) or an organic powder (for example, pulverized powder of a phenolic resin foam) can be added. These foam nucleating agents may be used individually or as a combination of two or more types without distinction between gases and solids. The timing of addition of the foam nucleating agent can be freely set so long as the foam nucleating agent is supplied into a mixer in which the foamable phenolic resin composition is mixed.

The additive amount of a gaseous foam nucleating agent relative to the blowing agent is preferably not less than 0.2 mass % and not more than 1.0 mass %, and more preferably not less than 0.3 mass % and not more than 0.5 mass % when the amount of the blowing agent is taken to be 100 mass %. The additive amount of a solid foam nucleating agent per 100 parts by mass, in total, of the phenolic resin and the surfactant is preferably not less than 3.0 parts by mass and not more than 10.0 parts by mass, and more preferably not less than 4.0 parts by mass and not more than 8.0 parts by mass.

The acidic curing agent that is added to the phenolic resin composition is required to be a curing agent that includes an organic acid as an acid component. The organic acid is preferably an aryl sulfonic acid or an anhydride thereof. Examples of aryl sulfonic acids and anhydrides thereof include toluene sulfonic acid, xylene sulfonic acid, phenol sulfonic acid, substituted phenol sulfonic acid, xylenol sulfonic acid, substituted xylenol sulfonic acid, dodecylbenzene sulfonic acid, benzene sulfonic acid, naphthalene sulfonic acid, and the like, and anhydrides of any of the preceding examples. One of these organic acids may be used, or a combination of two or more of these organic acids may be used. Note that in the present embodiment, resorcinol, cresol, saligenin (o-methylolphenol), p-methylolphenol, or the like may be added as a curing aid. Moreover, these curing agents may be diluted with a solvent such as ethylene glycol or diethylene glycol.

The amount of the acidic curing agent that is used differs depending on the type of the acidic curing agent, but it is necessary for the organic acid serving as an acid component to be added such as to satisfy a relationship described below in order to achieve incombustibility and a high closed cell ratio of the phenolic resin. Specifically, when the density of the obtained foam is taken to be $x$ ($kg/m^3$) and the amount of the organic acid per 100 parts by mass, in total, of the phenolic resin and the surfactant is taken to be $y$ (parts by mass), it is required that $13.0-0.1x \leq y \leq 17.0-0.1x$. Note that it is preferable that $14.0-0.1x \leq y$, more preferable that $15.0-0.1x \leq y$, and even more preferable that $15.5-0.1x \leq y$. Para-toluene sulfonic acid monohydrate or the like can be used as the organic acid serving as an acid component. Moreover, a diluent such as diethylene glycol may optionally be used in combination. By setting the amount of the organic acid as $(13.0-0.1x)$ parts or more, curing as a foam can easily progress without being influenced by addition of the flame retardant, and the closed cell ratio can be increased. On the other hand, by setting the amount of the organic acid as $(17.0-0.1x)$ parts or less, a rise of foam internal temperature during foam shaping can be inhibited, and the closed cell ratio can be increased.

Note that the surfactant, flame retardant, and blowing agent that are contained in the foamable phenolic resin composition may be added to the phenolic resin in advance or may be added to the phenolic resin at the same time as the acidic curing agent.

The density of the phenolic resin foam of the present embodiment is not less than 30 $kg/m^3$ and not more than 80 $kg/m^3$, preferably not less than 35 $kg/m^3$ and not more than 70 kg/m³, and more preferably not less than 45 kg/m³ and not more than 65 kg/m³. A density of 30 kg/m³ or more is preferable because flame retardant performance increases, whereas a density of 80 kg/m³ or less is preferable because the phenolic resin foam becomes easier to handle.

The density can be adjusted to a desired value through adjustment of the amount of the organic acid and also through altering the proportion of the blowing agent, the temperature of the foamable phenolic resin composition, the timing of pre-shaping in a step of ejecting the mixed foamable phenolic resin composition onto a lower surface material, the ratio with the additive amount of the foaming agent, and curing conditions such as temperature and residence time.

When flame retardance of the phenolic resin foam of the present embodiment is evaluated under certain conditions described in the EXAMPLES section using a cone calorimeter, the total amount of heat release over 20 minutes does not reach 8 MJ/m², and the phenolic resin foam displays very high flame retardant performance (i.e., incombustibility).

Moreover, it is preferable that the time taken for the total amount of heat release to reach 8 MJ/m² is 20 minutes or more even in a situation in which a heat release test is performed using a cone calorimeter after 30 weeks of aging at 70° C. When the aforementioned condition is satisfied even under accelerated conditions of 30 weeks left at 70° C., stable flame retardance can be maintained over a long period of 30 years at normal temperature as previously described, and thus the phenolic resin foam can be considered to have excellent long-term durability. In a case in which the density of the foam is less than 30 kg/m³, 30 weeks of aging at 70° C. causes slight weakening of the resin, resulting in cracks forming more readily in a sample and the total amount of heat release reaching 8 MJ/m² in a shorter time during a heat release test using a cone calorimeter.

The closed cell ratio of the phenolic resin foam of the present embodiment is 85% or more, and preferably 90% or more. Since the closed cell ratio serves as an indicator of thermal insulation performance, a closed cell ratio of 85% or more is preferable because this indicates good thermal insulation performance.

The closed cell ratio can mainly be adjusted to a desired value through adjustment of the reactivity and temperature of the phenolic resin, and also through alteration of curing temperature conditions and the like.

The average cell diameter of the phenolic resin foam of the present embodiment is preferably not less than 70 μm and not more than 180 μm, more preferably not less than 70 μm and not more than 150 μm, and even more preferably not less than 70 μm and not more than 130 μm. When the average cell diameter is 70 μm or more, the density of the foam can easily be set within the range according to the present disclosure. As a result, it is easy to reduce the thermal conduction ratio of a resin part of the foam and thereby improve thermal insulation performance of the phenolic resin foam. Conversely, an average cell diameter of 180 μm or less makes it easier to inhibit thermal conduction due to radiation. The average cell diameter can be adjusted to a desired value through adjustment of the reactivity and temperature of the phenolic resin and also through alteration of the additive amount of the foam nucleating agent, the ratio of the additive amount of the blowing agent and the additive amount of the organic acid used as the acidic curing agent, the curing temperature conditions, and the like.

The phenolic resin foam of the present embodiment preferably has a thermal conductivity of 0.030 W/m·K or less. The thermal conductivity is more preferably 0.028 W/m·K or less, and even more preferably 0.026 W/m·K or less. The thermal conductivity can be adjusted through the chemical composition and viscosity of the phenolic resin, the type and proportion of the blowing agent, the proportion of a foam nucleating agent, the curing conditions, the foaming conditions, and the like, for example.

The thermal conductivity after 30 weeks of aging at 70° C. is also preferably 0.045 W/m·K or less, more preferably 0.043 W/m·K or less, and even more preferably 0.041 W/m·K or less. In the European Standard EN13166 ANNEX.C, which relates to aging evaluation of thermal resistance and thermal conductivity of thermal insulation materials, a test specimen after treatment at 70° C. for 25 weeks is taken to be equivalent to the same after 25 years. Based on the above, 30 weeks of aging at 70° C. is equivalent to 30 years at normal temperature since 1 week is equivalent to 1 year. Even when initial thermal conductivity is good, the thermal conductivity after aging as described above does not satisfy a range such as described above in a case in which fine holes are opened in cells membranes (i.e., cells are ruptured), and thus the foam cannot be considered a good thermal insulation material in such a case. In a case in which the condition described above is satisfied even under accelerated conditions of 30 weeks left at 70° C., thermal insulation can be well maintained stably over a long period, and thus the foam can be considered to have excellent long-term durability.

The phenolic resin foam of the present embodiment preferably has a peak at either or both a diffraction angle 2θ of 14.9° to 15.9° and a diffraction angle 2θ of 16.2° to 17.2° in an X-ray diffraction pattern obtained through analysis by X-ray diffraction. Moreover, it is more preferable that a highest intensity peak in the X-ray diffraction pattern is present at either or both a diffraction angle 2θ of 14.9° to 15.9° and a diffraction angle 2θ of 16.2° to 17.2°, and even more preferable that a peak is present at both a diffraction angle 2θ of 14.9° to 15.9° and a diffraction angle 2θ of 16.2° to 17.2°.

Furthermore, it is particularly preferable that a peak is present at both a diffraction angle 2θ of 14.9° to 15.9° and a diffraction angle 2θ of 16.2° to 17.2° in an X-ray diffraction pattern obtained through analysis by X-ray diffraction and that when the maximum intensity of a peak at 14.9° to 15.9° is taken to be A and the maximum intensity of a peak at 16.2° to 17.2° is taken to be B, $0.5 \leq A/B \leq 4.5$, and most preferable that $1.0 \leq A/B \leq 4.5$.

Note that the angle position and maximum intensity of peaks of the diffraction angle 2θ in an X-ray diffraction pattern obtained through analysis by X-ray diffraction can be adjusted through the subsequently described combination and additive amount of flame retardants.

The phenolic resin foam of the present embodiment can be used by itself or can be joined to an external member and used in various applications. Examples of external members that can be used include one or a combination of board materials and sheet/film materials. Examples of suitable board materials include wooden boards such as normal plywood, structural plywood, particle board, and OSB, wood-wool cement board, wood chip cement board, gypsum board, flexible board, medium density fiberboard, calcium silicate board, magnesium silicate board, and volcanic silicates fiber reinforced multi-layer board. Examples of suitable sheet/film materials include polyester non-woven fabric, polypropylene non-woven fabric, inorganic filled glass fiber non-woven fabric, glass fiber non-woven fabric, paper, calcium carbonate paper, polyethylene-treated paper, polyethylene film, plastic moisture-proof film, asphalt waterproof paper, and aluminum foil (with or without holes).

Next, the production method of the phenolic resin foam set forth above is described in detail.

The production method of the phenolic resin foam may be a continuous production process that includes: a step of mixing a foamable phenolic resin composition that contains a phenolic resin, a surfactant, a flame retardant, a blowing agent, and an acidic curing agent including an organic acid using a mixer; a step of ejecting the foamable phenolic resin composition that has been mixed onto a surface material; a step of covering the foamable phenolic resin composition that has been ejected onto the surface material with a surface material from above, and performing foaming and curing of the foamable phenolic resin composition while carrying out pre-shaping; a step of main shaping that is a main step of performing foaming and a curing reaction; and a step of subsequently performing a post-cure that dissipates water in the phenolic resin composition.

The methods of pre-shaping and main shaping in the pre-shaping step and the main shaping step of the continuous production process may be any of various methods depending on the production objectives, and examples thereof include a method using a slat-type double conveyor, a method using a metal roll or a steel plate, and method using a combination of a plurality of such methods. In shaping using a slat-type double conveyor, for example, the foamable phenolic resin composition that is covered by upper and lower surface materials is continuously guided into the slat-type double conveyor, pressure is subsequently applied from above and below under heating, and foaming and curing are performed while performing adjustment to a specific thickness to enable shaping of a sheet shape.

The surface materials provided on at least upper and lower surfaces of the phenolic resin foam may be surface materials that display flexibility (flexible surface materials). Preferable examples of flexible surface materials that can be used include non-woven fabric and woven fabric containing polyester, polypropylene, nylon, or the like as a main component, paper such as kraft paper, glass fiber mixed paper, calcium hydroxide paper, aluminum hydroxide paper, or magnesium silicate paper, and non-woven fabric of inorganic fiber such as glass fiber non-woven fabric. Moreover, these surface materials may be mixed or stacked for use. In particular, in a case in which the surface materials are to be peeled from the resultant phenolic resin foam laminate so as to use just the foam, it is preferable to use a cheap material that can be disposed of after peeling. Note that such surface materials are typically provided in the form of a roll.

In the step of performing pre-shaping, the temperature of the foamable phenolic resin composition during initial pre-shaping is preferably not lower than 35° C. and not higher than 70° C.

The heating temperature control condition in the main shaping step that follows the pre-shaping step is preferably not lower than 65° C. and not higher than 100° C. In this section, the main shaping can be performed using an endless steel belt-type double conveyor, a slat-type double conveyor, a roll, or the like.

The post-cure step is performed after the pre-shaping step and the main shaping step. The temperature in the post-cure step is preferably not lower than 90° C. and not higher than 120° C.

EXAMPLES

The following provides a more detailed description of the present disclosure through examples and comparative examples.

<Synthesis of Phenolic Resin A>

A reactor was charged with 3,500 kg of 52 mass % formaldehyde aqueous solution (52 mass % formalin) and 2,510 kg of 99 mass % phenol (containing water as an impurity), these materials were stirred by a propeller rotation-type stirrer, and the internal liquid temperature of the reactor was adjusted to 40° C. through a temperature controller. Next, 48 mass % sodium hydroxide aqueous solution was added until the pH reached 8.7, and then heating was performed to 85° C. to carry out a reaction. At the stage at which the Ostwald viscosity of the reaction liquid reached 160 square millimeters per second (=160 $mm^2/s$; measurement value at 25° C.), the reaction liquid was cooled, and urea was added such that the urea content in the phenolic resin was 4.6 mass %. Thereafter, the reaction liquid was cooled to 30° C., and a 50 mass % aqueous solution of paratoluene sulfonic acid monohydrate was added until the pH reached 6.3. The resultant reaction liquid was then concentrated by a thin film evaporator to yield a phenolic resin A having a viscosity at 40° C. of 13,200 mPa·s and a water content of 4.1 mass %.

<Synthesis of Phenolic Resin B>

A reactor was charged with 3,500 kg of 52 mass % formaldehyde aqueous solution (52 mass % formalin) and 2,510 kg of 99 mass % phenol (containing water as an impurity), these materials were stirred by a propeller rotation-type stirrer, and the internal liquid temperature of the reactor was adjusted to 40° C. through a temperature controller. Next, 48 mass % sodium hydroxide aqueous solution was added until the pH reached 8.7, and then heating was performed to 85° C. to carry out a reaction. At the stage at which the Ostwald viscosity of the reaction liquid reached 160 square millimeters per second (=160 $mm^2/s$; measurement value at 25° C.), the reaction liquid was cooled, and urea was added such that the urea content in the phenolic resin was 4.6 mass %. Thereafter, the reaction liquid was cooled to 30° C., and a 50 mass % aqueous solution of paratoluene sulfonic acid monohydrate was added until the pH reached 6.3. The resultant reaction liquid was then concentrated by a thin film evaporator to yield a phenolic resin B having a viscosity at 40° C. of 7,800 mPa·s and a water content of 7.9 mass %.

<Synthesis of Phenolic Resin C>

A reactor was charged with 3,500 kg of 52 mass % formaldehyde aqueous solution (52 mass % formalin) and 2,510 kg of 99 mass % phenol (containing water as an impurity), these materials were stirred by a propeller rotation-type stirrer, and the internal liquid temperature of the reactor was adjusted to 40° C. through a temperature controller. Next, 50 mass % sodium hydroxide aqueous solution was added until the pH reached 8.7, and then heating was performed to 85° C. to carry out a reaction. At the stage at which the Ostwald viscosity of the reaction liquid reached 60 square millimeters per second (=60 $mm^2/s$; measurement value at 25° C.), the reaction liquid was cooled, and 570 kg of urea (equivalent to 15 mol % of the charged amount of formaldehyde) was added. Thereafter, the reaction liquid was cooled to 30° C., and a 50 mass % aqueous solution of paratoluene sulfonic acid monohydrate was added until the pH reached 6.4. The resultant reaction liquid was then concentrated by a thin film evaporator to yield a phenolic resin C having a viscosity at 40° C. of 6,900 mPa·s and a water content of 10.1 mass %.

<Measurement of Viscosity of Phenolic Resin Composition>

The viscosity of a phenolic resin was taken to be a measurement value obtained using a rotary viscometer (R-100 produced by Toki Sangyo Co., Ltd.; rotor part: 3°×R-14) after 3 minutes of stabilization at 40° C.

<Measurement of Water Content of Phenolic Resin>

A phenolic resin was dissolved within a range of 3 mass % to 7 mass % in dehydrated methanol (produced by Kanto Chemical Co., Inc.) for which water content had been measured, the water content of the phenolic resin was determined by subtracting water in the dehydrated methanol from the water content of the solution, and the difference of the water content from the phenolic resin was taken to be the resin content of the phenolic resin. Measurement was performed using a Karl Fischer moisture meter (MKC-510 produced by Kyoto Electronics Manufacturing Co., Ltd.)

Example 1

<Production of Phenolic Resin Foam>

As shown in Table 1, a composition containing an ethylene oxide-propylene oxide block copolymer and polyoxyethylene dodecyl phenyl ether in a mass ratio of 50% each was mixed as a surfactant in a proportion of 3.5 parts by mass per 100 parts by mass of the synthesized phenolic resin A, 22.0 parts by mass of TAIEN C=II (produced by Taihei Chemical Industrial Co., Ltd.) was further added as a flame retardant, and kneading thereof was performed by a twin screw extruder (produced by Technovel Corporation) to obtain a flame retardant-containing phenolic resin composition.

Thereafter, 3.1 parts by mass of a mixture of 40 mass % of isopropyl chloride and 60 mass % of 1-chloro-3,3,3-trifluoropropene as a blowing agent, 0.40 mass % relative to the blowing agent of nitrogen as a foam nucleating agent, and 10.6 parts by mass of a composition formed of a mixture of 80 mass % of xylene sulfonic acid and 20 mass % of diethylene glycol as an acidic curing agent (additive amount of organic acid per 100 parts by mass, in total, of phenolic resin and surfactant: 8.5 parts by mass) were added per 100 parts by mass of the flame retardant-containing phenolic resin composition, and these materials were then supplied to a variable rotation speed mixing head that was temperature controlled to 30° C.

A foamable phenolic resin composition obtained through mixing of the materials was distributed in a multiport distribution pipe and was supplied onto a moving surface material. Note that a mixer disclosed in JP H10-225993 A was used as the mixing device (mixer). Specifically, the used mixer included a feeding port for the phenolic resin and the blowing agent containing the foam nucleating agent in an upper side surface of the mixer and included a feeding port for the acidic curing agent in a side surface in proximity to the center of a stirring part where stirring was performed by a rotor. Downstream of the stirring part was connected to nozzles for ejection of the foamable phenolic resin composition. Moreover, the mixer comprised a part up to the acidic curing agent feeding port as a mixing part (preceding stage), a part from the acidic curing agent feeding port up to a part where stirring ends as a mixing part (subsequent stage), and a part from the part where stirring ends up to the nozzles as a distribution part. The distribution part included a plurality of nozzles at the end thereof and was designed such that the foamable phenolic resin composition that had been mixed was uniformly distributed. The temperatures of the mixer and the nozzles were adjusted using temperature control water, and the temperature of the temperature control water was 23° C. for each thereof. Moreover, a thermocouple was installed at an ejection port of the multiport distribution pipe to enable detection of the temperature of the foamable phenolic resin composition, and the rotation speed of the mixing head was set as 650 rpm. The foamable phenolic resin composition that was ejected onto the surface material had a temperature of 44° C. The foamable phenolic resin composition that had been supplied onto the surface material was introduced into a pre-shaping step, and the equipment temperature in this pre-shaping step was set as 60° C. Note that the pre-shaping was performed by a metal roll from above a surface material covering from above.

Next, the foamable phenolic resin composition was fed into a slat-type double conveyor heated to 83° C. with the foamable phenolic resin composition sandwiched between two surface materials, curing was performed with a residence time of 15 minutes, and then a further 2 hours of heating was performed in a 110° C. oven to obtain a phenolic resin foam laminate. Note that polyester non-woven fabric (Asahi Kasei ELTAS E05030) having a basis weight of 30 g/m$^2$ was used for both the upper and lower surface materials. The surface materials were peeled carefully from both sides of the phenolic resin foam laminate to obtain a phenolic resin foam of 30 mm in thickness.

When the density and average cell diameter of the phenolic resin foam were subsequently measured by the methods described below, the phenolic resin foam had a density of 60.0 kg/m$^3$ and an average cell diameter of 105 μm. Thermal conductivity measurement, X-ray diffraction analysis, and flame retardance evaluation were also performed with respect to the obtained phenolic resin foam by methods described below. The results are shown in Table 2.

<Density of Phenolic Resin Foam>

A 200 mm square of the phenolic resin foam was taken as a sample and then the mass and apparent volume thereof were measured to determine the density of the foam in accordance with JIS K7222. Note that an evaluation of "Y" was given in a case in which a range of 13.0−0.1x≤y≤17.0−0.1x for the added number of parts y of the organic acid, which is defined based on the density x of the foam, was satisfied, and an evaluation of "N" was given in a case in which this range was not satisfied.

<Average Cell Diameter of Phenolic Resin Foam>

A photograph was taken at ×50 magnification with respect to a cross-section of a test specimen obtained by cutting parallel to front and rear surfaces of the phenolic resin foam at the approximate thickness direction center thereof. Four straight lines of 9 cm in length (equivalent to 1,800 μm in the actual foam cross-section) were drawn in the obtained photograph in a manner that avoided voids, a number of cells measured in accordance with the number of cells crossed by each of the straight lines was determined for each of the straight lines, and a value obtained by dividing the average value of the number of cells by 1,800 μm was taken to be the average cell diameter. Note that this method is based on a method described in JIS K6402.

<Closed Cell Ratio of Phenolic Resin Foam>

The closed cell ratio of the phenolic resin foam was measured in accordance with ASTM-D-2856. Specifically, after the surface materials had been removed from the phenolic resin foam laminate, a cork borer was used to hollow out a cylindrical sample of 30 mm to 32 mm in diameter. The sample was cut and aligned to a height of 9 mm to 13 mm such that the thickness direction center of the phenolic resin foam was at the center, and then the sample volume was measured by a standard usage method of an air comparison pycnometer (1,000 produced by Tokyo Science Co., Ltd.). The volume of walls (parts other than cells) calculated from the sample mass and the phenolic resin density was subtracted from the sample volume. The resultant value was then divided by the apparent volume of the sample calculated from the external dimensions thereof and was multiplied by 100 to obtain a value that was determined to be the closed cell ratio. Note that the density of the phenolic resin was taken to be 1.3 kg/L. Also note that in the case of a phenolic resin foam having a thickness of 30 mm or less, a cork borer was used to hollow out a cylindrical sample of 30 mm to 32 mm in diameter, the sample was cut and aligned to a height of 4 mm to 6 mm such that the thickness direction center of the phenolic resin foam was at the center, and then evaluation was performed in the same manner as described above.

<Thermal Conductivity of Phenolic Resin Foam>

The thermal conductivity of the phenolic resin foam was measured in accordance with JIS A 1412-2:1999 by the following method in a 23° C. environment.

A 600 mm square was cut out from the phenolic resin foam, a specimen obtained through this cutting was left in an atmosphere having a temperature of 23±1° C. and a humidity of 50±2%, and the change in mass over time was measured every 24 hours. This state was maintained until the rate of change from the directly preceding mass was 0.2 mass % or less. The surface materials were peeled from the 600 mm-square phenolic resin foam for which the rate of change from the directly preceding mass was 0.2 mass % or less in a manner such as to not damage the phenolic resin foam, and then the phenolic resin foam was introduced into a thermal conductivity measurement apparatus placed in the same environment.

The thermal conductivity was measured using a measurement apparatus (EKO Instruments Co., Ltd.; product name: HC-074/600) in which a single test specimen, symmetrical configuration method was adopted. The thermal conductivity in a 23° C. environment was measured under conditions of a low-temperature plate of 13° C. and high-temperature plate of 33° C.

Note that the thermal conductivity was measured for both a phenolic resin foam that had been placed at normal temperature and a phenolic resin foam that had been left at 70° C. for 30 weeks.

<Analysis of Phenolic Resin Foam by X-Ray Diffraction>

A SmartLab produced by Rigaku was used as an X-ray diffraction analyzer for the phenolic resin foam. A roughly central part of a sample was cut out as a measurement sample and was loaded into a sample cell (made of Al). The measurement conditions were as follows. The X-ray tube was a Cu Kα X-ray tube, the optical system was a parallel beam system, the tube voltage/tube current was 45 kV/200 mA, the scan range was 5° to 80°, the scan step was 0.02°, the scan speed was 10°/min, and the detector was a one-dimensional semiconductor detector.

Note that in an X-ray diffraction pattern that was obtained through analysis of the phenolic resin foam obtained in Example 1 by X-ray diffraction, a peak present at 15.4° had the highest intensity.

<Evaluation of Flame Retardant Performance of Phenolic Resin Foam by Cone Calorimeter>

In evaluation of a phenolic resin foam having a thickness of 50 mm or less, a sample of 99±1 mm×99±1 mm was cut out from the phenolic resin foam. The time taken for the total amount of heat release to reach 8 MJ/m$^2$ upon heating with a radiant intensity of 50 kW/m$^2$ was measured in accordance with ISO-5660. Note that in the case of a phenolic resin foam have a thickness of more than 50 mm, the phenolic resin foam was slice sectioned perpendicular to the thickness direction with one out of an upper surface and a lower surface in the thickness direction as one surface such that the thickness of the sample was 50 mm, and then evaluation was performed with the surface that had not been sectioned as a heated surface side. Moreover, in a case in which a surface material, siding, or the like was attached to the sample for evaluation of flame retardant performance, this was removed to obtain a phenolic resin foam. An evaluation of "A" was given in a case in which the time taken for the total amount of heat release to reach 8 MJ/m$^2$ was 21.0 minutes or more, an evaluation of "B" was given in a case in which this time was not less than 20.5 minutes and less than 21.0 minutes, an evaluation of "C" was given in a case in which this time was not less than 20.0 minutes and less than 20.5 minutes, and an evaluation of "D" was given in a case in which this time was less than 20 minutes.

The test time was taken from when the test specimen surface was irradiated with radiant heat, and, simultaneously thereto, an electric spark was actuated. The concentrations of oxygen, carbon monoxide, and carbon dioxide were measured at intervals of 5 seconds or less.

Note that flame retardance was evaluated for both a phenolic resin foam that had been placed at normal temperature and a phenolic resin foam that had been left at 70° C. for 30 weeks.

Example 2

A phenolic resin foam having a density of 60.0 kg/m$^3$ was produced in the same way as in Example 1 with the exception that 22.0 parts by mass of TAIEN K (produced by Taihei Chemical Industrial Co., Ltd.) was added as a flame retardant as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 16.4° had the highest intensity.

Example 3

A phenolic resin foam having a density of 60.0 kg/m$^3$ was produced in the same way as in Example 1 with the exception that 17.0 parts by mass of TAIEN C=II and 5.0 parts by mass of TAIEN K were added as flame retardants as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.5° had the highest intensity.

Example 4

A phenolic resin foam having a density of 60.0 kg/m$^3$ was produced in the same way as in Example 1 with the exception that 20.0 parts by mass of TAIEN C=II and 2.0 parts by mass of TAIEN K were added as flame retardants as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.5° had the highest intensity.

Example 5

A phenolic resin foam having a density of 60.0 kg/m$^3$ was produced in the same way as in Example 1 with the exception that 12.0 parts by mass of TAIEN C=II and 10.0 parts by mass of TAIEN K were added as flame retardants as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 16.6° had the highest intensity.

Example 6

A phenolic resin foam having a density of 60.0 kg/m$^3$ was produced in the same way as in Example 1 with the exception that 15.5 parts by mass of TAIEN C=II and 6.5 parts by mass of TAIEN K were added as flame retardants as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.4° had the highest intensity.

Example 7

A phenolic resin foam having a density of 60.0 kg/m$^3$ was produced in the same way as in Example 1 with the exception that 17.0 parts by mass of Exolit AP 423 (produced by Clariant) and 5.0 parts by mass of TAIEN K were added as flame retardants as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.4° had the highest intensity.

Example 8

A phenolic resin foam having a density of 60.0 kg/m$^3$ was produced in the same way as in Example 1 with the exception that the phenolic resin B was used as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.4° had the highest intensity.

Example 9

A phenolic resin foam having a density of 60.0 kg/m$^3$ was produced in the same way as in Example 1 with the exception that 8.8 parts by mass of the composition formed of a mixture of 80 mass % of xylene sulfonic acid and 20 mass % of diethylene glycol (additive amount of organic acid per 100 parts by mass, in total, of phenolic resin and surfactant: 7.0 parts by mass) was added per 100 parts by mass, in total, of the phenolic resin and the surfactant as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.3° had the highest intensity.

Example 10

A phenolic resin foam having a density of 60.0 kg/m$^3$ was produced in the same way as in Example 1 with the exception that 13.7 parts by mass of the composition formed of a mixture of 80 mass % of xylene sulfonic acid and 20 mass % of diethylene glycol (additive amount of organic acid per 100 parts by mass, in total, of phenolic resin and surfactant: 11.0 parts by mass) was added per 100 parts by mass, in total, of the phenolic resin and the surfactant as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.4° had the highest intensity.

Example 11

A phenolic resin foam was produced in the same way as in Example 1 with the exception that, as shown in Table 1, 10.0 parts by mass of a mixture of 40 mass % of isopropyl chloride and 60 mass % of 1-chloro-3,3,3-trifluoropropene as a blowing agent, 0.40 mass % relative to the blowing agent of nitrogen as a foam nucleating agent, and 13.7 parts by mass of the composition formed of a mixture of 80 mass % of xylene sulfonic acid and 20 mass % of diethylene glycol as an acidic curing agent (additive amount of organic acid per 100 parts by mass, in total, of phenolic resin and surfactant: 11.1 parts by mass) were added to 100 parts by mass of the flame retardant-containing phenolic resin composition, and the amount of the resin composition supplied to the variable rotation speed mixing head that was temperature controlled to 30° C. was adjusted such that the phenolic resin foam had a density of 35 kg/m$^3$. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.4° had the highest intensity.

Example 12

A phenolic resin foam was produced in the same way as in Example 1 with the exception that 2.7 parts by mass of a mixture of 75 mass % of cyclopentane and 25 mass % of isopentane was used as a blowing agent per 100 parts by mass of the flame retardant-containing phenolic resin composition as shown in Table 1. Thereafter, thermal conductivity measurement, X-ray diffraction analysis, and flame retardance evaluation were performed. The results are shown in Table 2. Note that in an X-ray diffraction pattern obtained through analysis of the obtained phenolic resin foam by X-ray diffraction, a peak present at 15.4° had the highest intensity.

Comparative Example 1

A phenolic resin foam having a density of 38.7 kg/m$^3$ was produced in the same way as in Example 1 with the exception that the added number of parts of the blowing agent was set as 4.2 parts by mass per 100 parts by mass of the phenolic resin composition, 7.0 parts by mass of the composition formed of a mixture of 80 mass % of xylene sulfonic acid and 20 mass % of diethylene glycol (additive amount of organic acid per 100 parts by mass, in total, of phenolic resin and surfactant: 5.6 parts by mass) was added, and a flame retardant was not added as shown in Table 1. Thereafter, thermal conductivity measurement, X-ray diffraction analysis, and flame retardance evaluation were performed. The results are shown in Table 2.

Comparative Example 2

A phenolic resin foam having a density of 60.0 kg/m³ was produced in the same way as in Comparative Example 1 with the exception that the added number of parts of the blowing agent was set as 6.3 parts by mass per 100 parts by mass of the phenolic resin composition, and 4.4 parts by mass of the composition formed of a mixture of 80 mass % of xylene sulfonic acid and 20 mass % of diethylene glycol (additive amount of organic acid per 100 parts by mass, in total, of phenolic resin and surfactant: 3.5 parts by mass) was added as shown in Table 1. Thereafter, thermal conductivity measurement, X-ray diffraction analysis, and flame retardance evaluation were performed. The results are shown in Table 2.

Comparative Example 3

A phenolic resin foam having a density of 60.0 kg/m³ was produced in the same way as in Example 1 with the exception that 8.5 parts by mass of the composition formed of a mixture of 80 mass % of xylene sulfonic acid and 20 mass % of diethylene glycol (additive amount of organic acid per 100 parts by mass, in total, of phenolic resin and surfactant: 6.8 parts by mass) was added per 100 parts by mass, in total, of the phenolic resin and the surfactant as shown in Table 1. Thereafter, thermal conductivity measurement, X-ray diffraction analysis, and flame retardance evaluation were performed. The results are shown in Table 2.

Comparative Example 4

A phenolic resin foam having a density of 60.0 kg/m³ was produced in the same way as in Example 1 with the exception that 14.0 parts by mass of the composition formed of a mixture of 80 mass % of xylene sulfonic acid and 20 mass % of diethylene glycol (additive amount of organic acid per 100 parts by mass, in total, of phenolic resin and surfactant: 11.2 parts by mass) was added per 100 parts by mass, in total, of the phenolic resin and the surfactant as shown in Table 1. Thereafter, thermal conductivity measurement, X-ray diffraction analysis, and flame retardance evaluation were performed. The results are shown in Table 2.

Comparative Example 5

A phenolic resin foam having a density of 60.0 kg/m³ was produced in the same way as in Example 1 with the exception that the phenolic resin C corresponding to PTL 1 was used, only 1-chloro-3,3,3-trifluoropropene was used as a blowing agent, and 11.0 parts by mass of the composition formed of a mixture of 80 mass % of xylene sulfonic acid and 20 mass % of diethylene glycol (additive amount of organic acid per 100 parts by mass, in total, of phenolic resin and surfactant: 8.8 parts by mass) was added per 100 parts by mass, in total, of the phenolic resin and the surfactant as shown in Table 1. Thereafter, thermal conductivity measurement, X-ray diffraction analysis, and flame retardance evaluation were performed. The results are shown in Table 2.

TABLE 1

| | Phenolic resin | Water content of phenolic resin [mass %] | Added number of parts of organic acid per 100 parts by mass, in total, of phenolic resin and surfactant [y; parts by mass] | Blowing agent | Flame retardant (parts by mass) |
|---|---|---|---|---|---|
| Example 1 | A | 4.1 | 8.5 | Isopropyl chloride 40 mass %/ 1-Chloro-3,3,3-trifluoropropene 60 mass % | TAIEN C = II (22) |
| Example 2 | A | 4.1 | 8.5 | Isopropyl chloride 40 mass %/ 1-Chloro-3,3,3-trifluoropropene 60 mass % | TAIEN K (22) |
| Example 3 | A | 4.1 | 8.5 | Isopropyl chloride 40 mass %/ 1-Chloro-3,3,3-trifluoropropene 60 mass % | TAIEN C = II (17)/ TAIEN K (5) |
| Example 4 | A | 4.1 | 8.5 | Isopropyl chloride 40 mass %/ 1-Chloro-3,3,3-trifluoropropene 60 mass % | TAIEN C = II (20.0)/ TAIEN K (2.0) |
| Example 5 | A | 4.1 | 8.5 | Isopropyl chloride 40 mass %/ 1-Chloro-3,3,3-trifluoropropene 60 mass % | TAIEN C = II (12.0)/ TAIEN K (10.0) |
| Example 6 | A | 4.1 | 8.5 | Isopropyl chloride 40 mass %/ 1-Chloro-3,3,3-trifluoropropene 60 mass % | TAIEN C = II (15.5)/ TAIEN K (6.5) |
| Example 7 | A | 4.1 | 8.5 | Isopropyl chloride 40 mass %/ 1-Chloro-3,3,3-trifluoropropene 60 mass % | Exolit AP 423 (17.0)/ TAIEN K (5.0) |
| Example 8 | B | 7.9 | 8.5 | Isopropyl chloride 40 mass %/ 1-Chloro-3,3,3-trifluoropropene 60 mass % | TAIEN C = II (22) |
| Example 9 | A | 4.1 | 7.0 | Isopropyl chloride 40 mass %/ 1-Chloro-3,3,3-trifluoropropene 60 mass % | TAIEN C = II (22) |
| Example 10 | A | 4.1 | 11.0 | Isopropyl chloride 40 mass %/ 1-Chloro-3,3,3-trifluoropropene 60 mass % | TAIEN C = II (22) |
| Example 11 | A | 4.1 | 11.1 | Isopropyl chloride 40 mass %/ 1-Chloro-3,3,3-trifluoropropene 60 mass % | TAIEN C = II (22) |
| Example 12 | A | 4.1 | 8.5 | Cyclopentane 75 mass %/ Isopentane 25 mass % | TAIEN C = II (22) |
| Comparative Example 1 | A | 4.1 | 5.6 | Isopropyl chloride 40 mass %/ 1-Chloro-3,3,3-trifluoropropene 60 mass % | — |
| Comparative Example 2 | A | 4.1 | 3.5 | Isopropyl chloride 40 mass %/ 1-Chloro-3,3,3-trifluoropropene 60 mass % | — |
| Comparative Example 3 | A | 4.1 | 6.8 | Isopropyl chloride 40 mass %/ 1-Chloro-3,3,3-trifluoropropene 60 mass % | TAIEN C = II (22) |
| Comparative Example 4 | A | 4.1 | 11.2 | Isopropyl chloride 40 mass %/ 1-Chloro-3,3,3-trifluoropropene 60 mass % | TAIEN C = II (22) |
| Comparative Example 5 | C | 10.1 | 8.8 | 1-Chloro-3,3,3-trifluoropropene 100 mass % | TAIEN C = II (22) |

TABLE 2

| | | | | | | | Phenolic resin foam | | | | |
|---|---|---|---|---|---|---|---|---|---|---|---|
| | Density [kg/m³] | Compliance of added number of parts of organic acid | Closed cell ratio [%] | Average cell diameter [μm] | Thermal conductivity [W/mK] | Thermal conductivity (after 30 weeks at 70° C.) [W/mK] | Diffraction angle 2θ of peak at 14.9° to 15.9° [°] | Diffraction angle 2θ of peak at 16.2° to 17.2° [°] | A/B | Cone calorimeter evaluation | Cone calorimeter evaluation (after 30 weeks at 70° C.) |
| Example 1 | 60.0 | Y | 90 | 105 | 0.028 | 0.041 | 15.4 | — | — | A | A |
| Example 2 | 60.0 | Y | 90 | 130 | 0.028 | 0.041 | — | 16.4 | — | A | A |
| Example 3 | 60.0 | Y | 95 | 104 | 0.024 | 0.037 | 15.5 | 16.7 | 1.48 | A | A |
| Example 4 | 60.0 | Y | 92 | 104 | 0.026 | 0.039 | 15.5 | 16.8 | 4.49 | A | A |
| Example 5 | 60.0 | Y | 91 | 108 | 0.027 | 0.040 | 15.3 | 16.6 | 0.51 | A | A |
| Example 6 | 60.0 | Y | 93 | 105 | 0.025 | 0.038 | 15.4 | 16.7 | 1.02 | A | A |
| Example 7 | 60.0 | Y | 93 | 105 | 0.025 | 0.038 | 15.4 | 16.7 | 1.50 | A | A |
| Example 8 | 60.0 | Y | 90 | 178 | 0.030 | 0.043 | 15.4 | — | — | A | A |
| Example 9 | 60.0 | Y | 86 | 169 | 0.030 | 0.043 | 15.3 | — | — | A | A |
| Example 10 | 60.0 | Y | 87 | 124 | 0.030 | 0.043 | 15.4 | — | — | A | A |
| Example 11 | 35.0 | Y | 91 | 110 | 0.024 | 0.037 | 15.4 | — | — | B | C |
| Example 12 | 60.0 | Y | 90 | 159 | 0.029 | 0.042 | 15.4 | — | — | A | A |
| Comparative Example 1 | 38.7 | N | 94 | 98 | 0.020 | 0.032 | — | — | — | D | D |
| Comparative Example 2 | 60.0 | N | 95 | 94 | 0.022 | 0.034 | — | — | — | D | D |
| Comparative Example 3 | 60.0 | N | 82 | 185 | 0.031 | 0.044 | 15.4 | — | — | A | A |
| Comparative Example 4 | 60.0 | N | 84 | 182 | 0.031 | 0.044 | 15.5 | — | — | A | A |
| Comparative Example 5 | 60.0 | Y | 58 | 230 | 0.034 | 0.069 | 15.3 | — | — | D | D |

INDUSTRIAL APPLICABILITY

According to the present disclosure, it is possible to use a phenolic resin foam having high thermal insulation performance in applications in which high flame retardant performance of an incombustible level is required and in applications in which phenolic resin foams could not previously be used due to shape restrictions.

The invention claimed is:

1. A phenolic resin foam having a density of 30 kg/m³ to 80 kg/m³, a closed cell ratio of 85% or more, and reaching a total amount of heat release of 8 MJ/m² in a time of 20 minutes or more in a heat release test performed using a cone calorimeter.

2. The phenolic resin foam according to claim 1, having a peak at either or both a diffraction angle 2θ of 14.9° to 15.9° and a diffraction angle 2θ of 16.2° to 17.2° in an X-ray diffraction pattern obtained through analysis by X-ray diffraction.

3. The phenolic resin foam according to claim 1, having a highest intensity peak at either or both a diffraction angle 2θ of 14.9° to 15.9° and a diffraction angle 2θ of 16.2° to 17.2° in an X-ray diffraction pattern obtained through analysis by X-ray diffraction.

4. The phenolic resin foam according to claim 1, having a peak at both a diffraction angle 2θ of 14.9° to 15.9° and a diffraction angle 2θ of 16.2° to 17.2° in an X-ray diffraction pattern obtained through analysis by X-ray diffraction.

5. The phenolic resin foam according to claim 1, having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 0.5≤A/B≤4.5.

6. The phenolic resin foam according to claim 1, having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 1.0≤A/B≤4.5.

7. The phenolic resin foam according to claim 2, having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 0.5≤A/B≤4.5.

8. The phenolic resin foam according to claim 3, having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 0.5≤A/B≤4.5.

9. The phenolic resin foam according to claim 4, having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 0.5≤A/B≤4.5.

10. The phenolic resin foam according to claim 2, having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 1.0≤A/B≤4.5.

11. The phenolic resin foam according to claim 3, having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 1.0≤A/B≤4.5.

12. The phenolic resin foam according to claim 4, having a peak at both a diffraction angle 2θ of 14.9° to 15.9° and a diffraction angle 2θ of 16.2° to 17.2° in an X-ray diffraction pattern obtained through analysis by X-ray diffraction, and that when maximum intensity of a peak at 14.9° to 15.9° is taken to be A and maximum intensity of a peak at 16.2° to 17.2° is taken to be B, 1.0≤A/B≤4.5.

\* \* \* \* \*